J. L. JOHNSON.
MOLDING MACHINE.
APPLICATION FILED JULY 23, 1910.
1,001,528.
Patented Aug. 22, 1911.
4 SHEETS—SHEET 2.
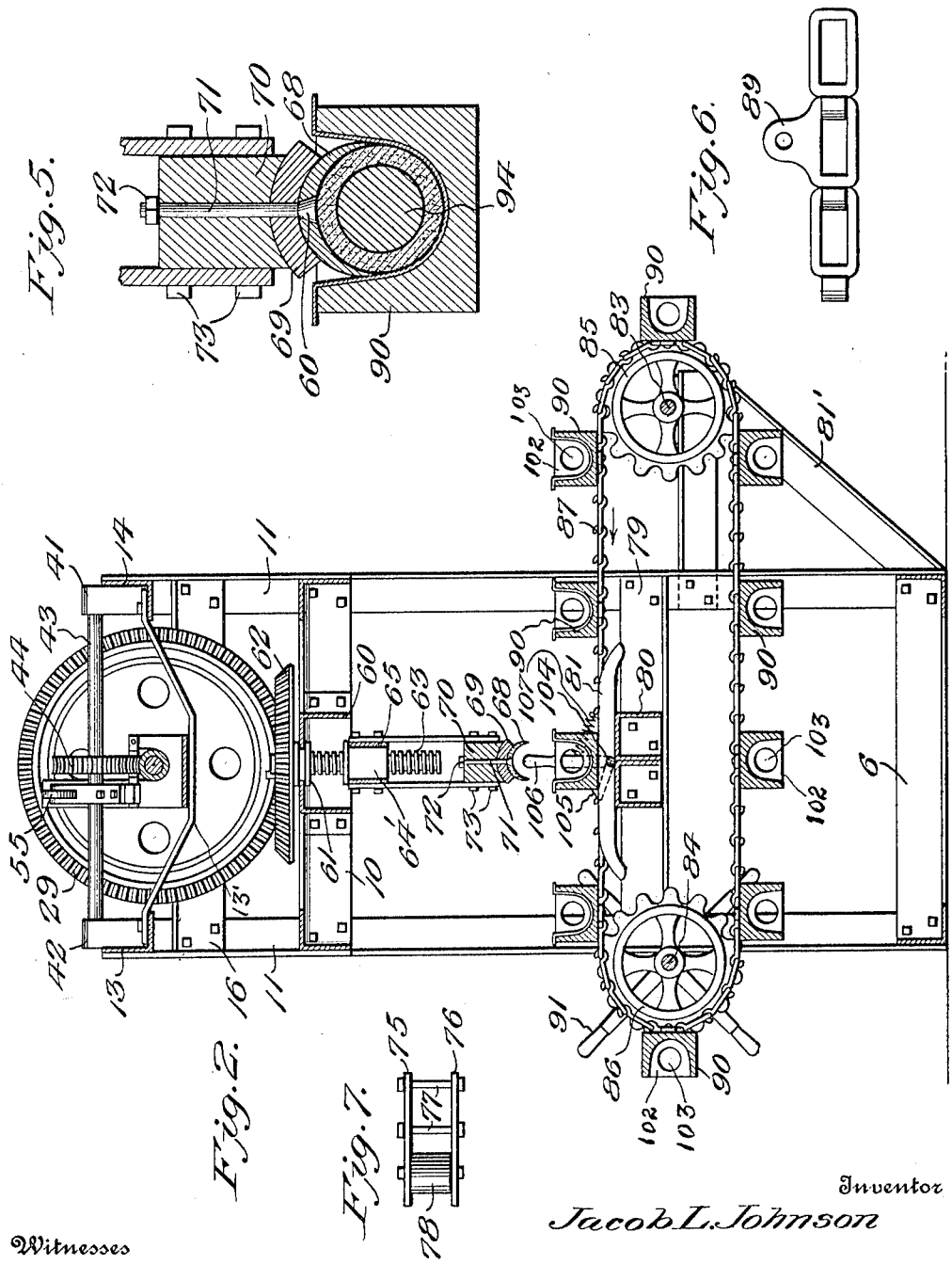
Witnesses
Edwin G. McKee
John A. Dragan
Inventor
Jacob L. Johnson
By Victor J. Evans
Attorney

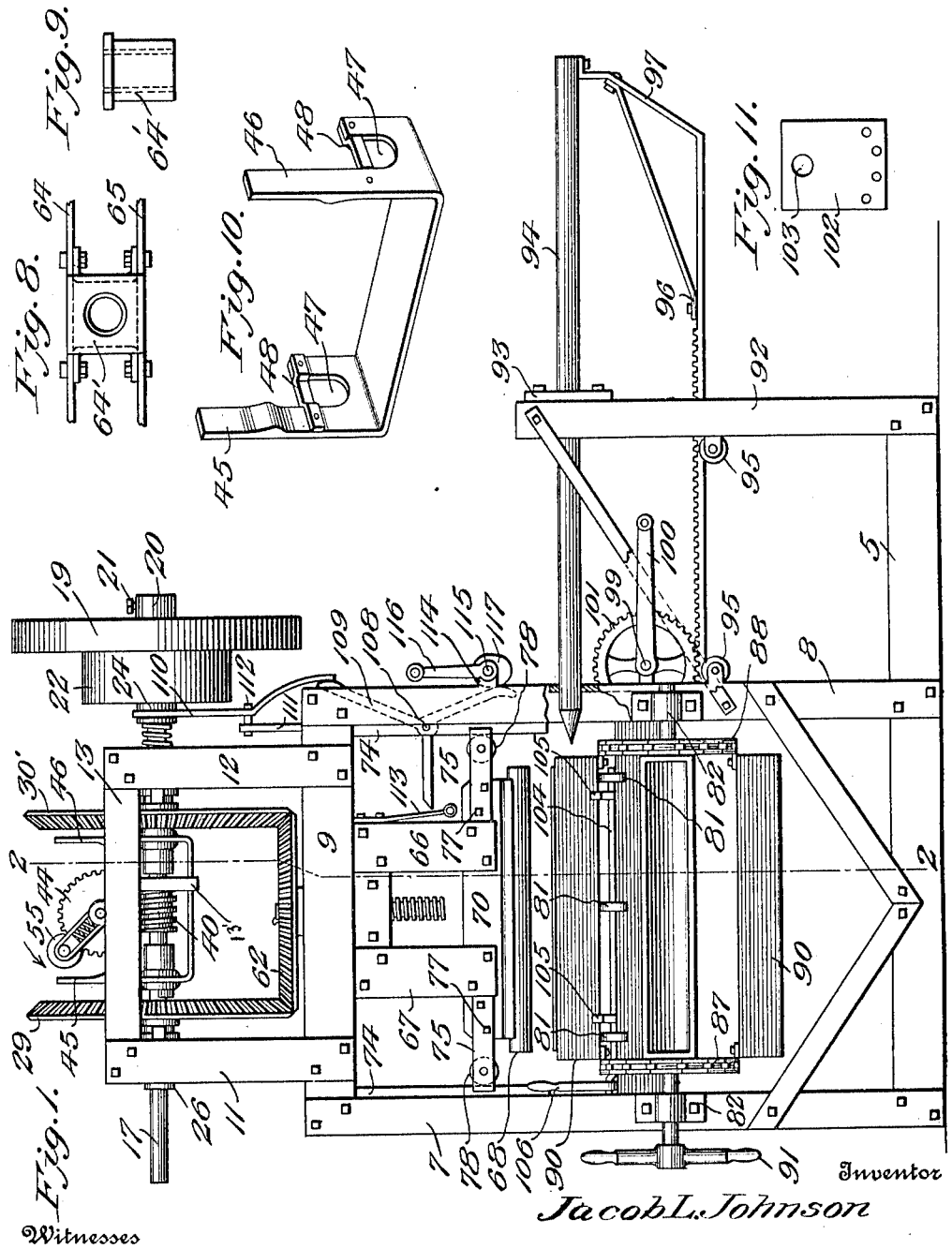

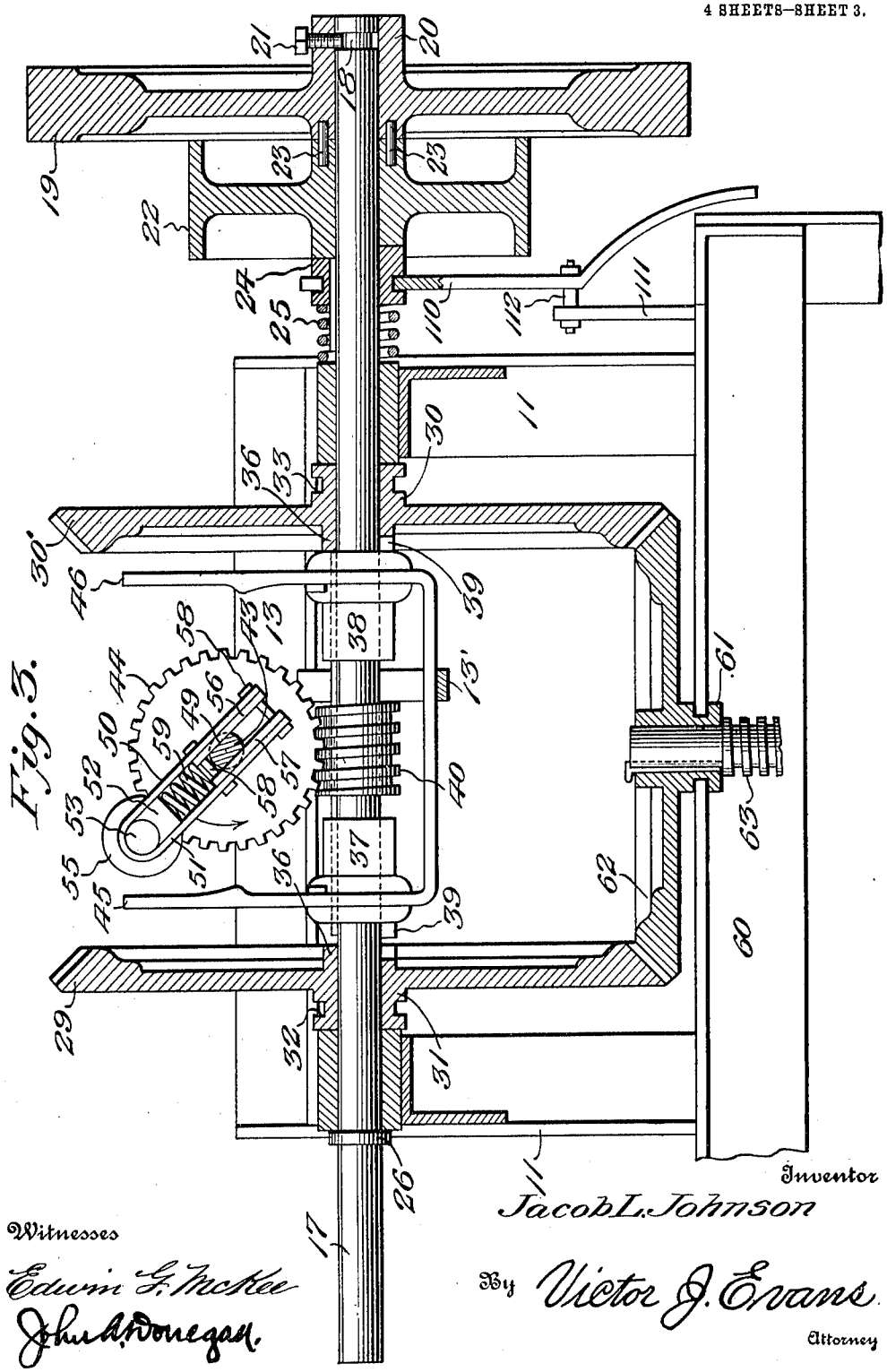

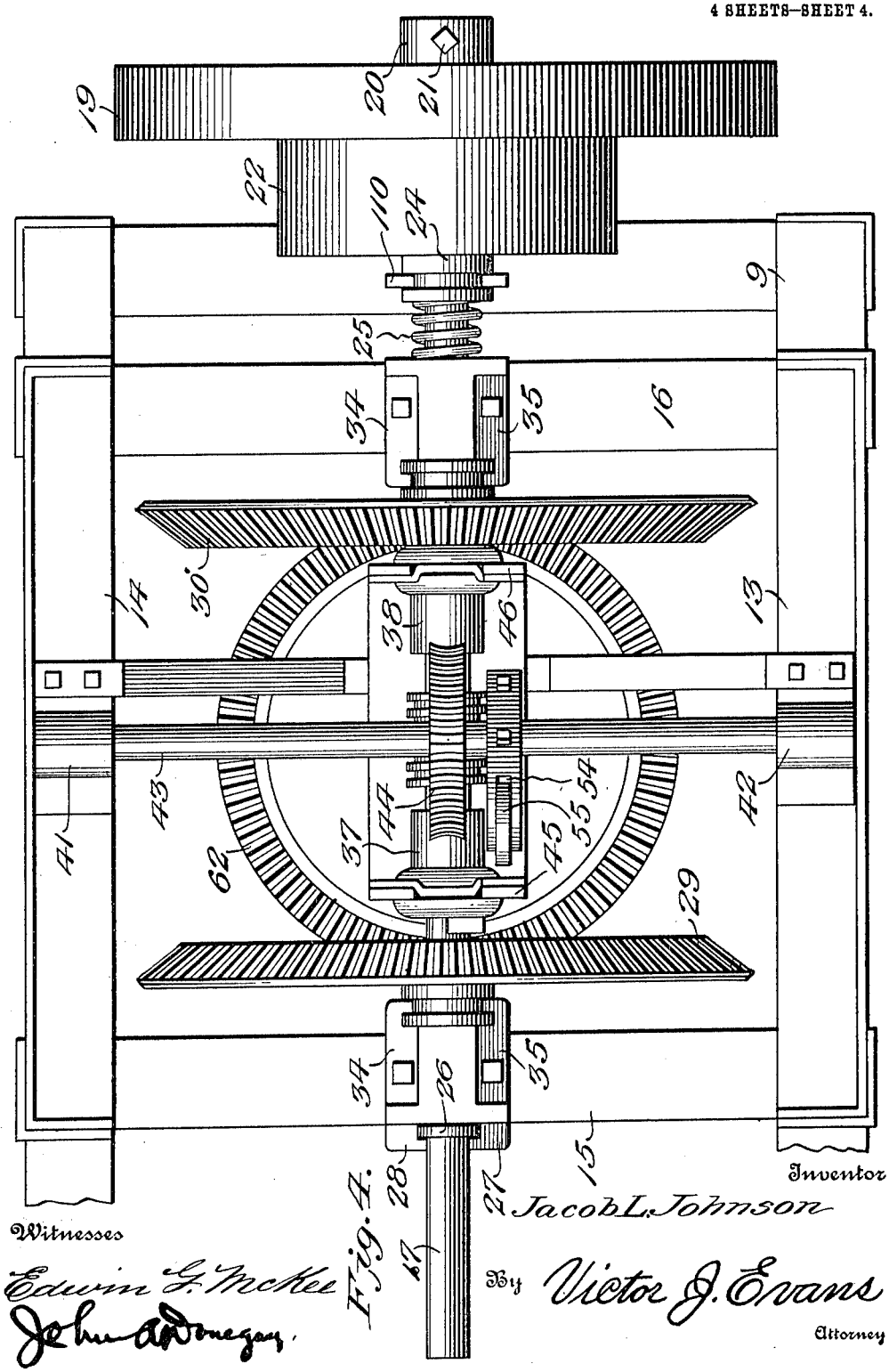

UNITED STATES PATENT OFFICE.

JACOB L. JOHNSON, OF HEREFORD, TEXAS.

MOLDING-MACHINE.

1,001,528. Specification of Letters Patent. Patented Aug. 22, 1911.

Application filed July 23, 1910. Serial No. 573,440.

*To all whom it may concern:*

Be it known that I, JACOB L. JOHNSON, a citizen of the United States, residing at Hereford, in the county of Deaf Smith and State of Texas, have invented new and useful Improvements in Molding-Machines, of which the following is a specification.

This invention relates to improvements in molding machines and more particularly to the type employed for molding tiling.

One object of the invention is the provision of a molding machine comprising a stationary mold section, and a movable mold section, and means for automatically actuating the movable mold section to move into and out of engagement with the stationary mold section.

Another object is the provision of a molding machine provided with a movable mold section and a power shaft for actuating the said mold section and means to effect disengagement between the power shaft and a driving mechanism when the movable mold section is at a certain position.

A further object is the provision of a means for automatically reciprocating the movable mold section.

A still further object is the provision of a molding machine provided with a plurality of mold sections arranged on an endless carrier.

With these and other objects in view, which will more fully hereinafter appear, the present invention consists in certain novel details of construction and arrangement of parts, hereinafter fully described, illustrated in the accompanying drawings, and more particularly pointed out in the appended claims; it being understood that various changes in the form, proportion, size, and minor details of the device may be made, within the scope of the appended claims, without departing from the spirit or sacrificing any of the advantages of the invention.

In the accompanying drawings, forming part of the specification:—Figure 1 is a front elevation of the device. Fig. 2 is a sectional end view on the line 2—2 of Fig. 1. Fig. 3 is a detail vertical section of the upper end portion of the device. Fig. 4 is a plan view of the device. Fig. 5 is a detail sectional end view of the mold sections, core, and support for the reciprocating mold section. Fig. 6 is a plan view of a portion of one of the conveyer chains. Fig. 7 is a detail plan of one of the guides for the reciprocating mold section. Fig. 8 is a detail plan view of the bushing, in which the actuating screw is mounted. Fig. 9 is a side elevation of the bushing. Fig. 10 is a detail perspective of the shifting member. Fig. 11 is a detail front elevation of the core guide.

Similar numerals of reference are employed to designate corresponding parts throughout.

The device includes in its construction an oblong base frame the opposite sides of which are designated by the numeral 5 and the opposite ends by the numeral 6. Rising from the corners at one end of the base frame are uprights 7, and rising from the medial portion of the sides of said frame are uprights 8 corresponding in length to the length of the uprights 7. The uprights 7 and 8 are connected at their upper ends by side sills 9 extending longitudinally of the frame, and are further connected by transversely disposed end sills 10. Rising from the opposite end portions of the side sills 9 are standards 11 and 12, the upper ends of which are connected by longitudinally disposed beams 13 and 14, and are further connected by transversely disposed beams 15 and 16. The beams 15 and 16 are disposed a trifle below the beams 13 and 14 and are provided with boxings in which are journaled the opposite end portions of a shaft 17. The opposite end portions of the shaft 17 extend beyond the outer sides of the uprights, and formed in one end of the shaft 17 is a circular groove 18.

Journaled on the shaft 17 is a fly wheel 19, the said fly wheel being provided with a hub 20 having a radial opening through which extends a set-screw 21, the inner end of which is arranged in the groove 18, the set-screw serving to prevent endwise movement of the fly wheel on the shaft 17. Journaled on the shaft 17 and adjacent to the inner side of the fly wheel 19 is a pulley 22. Connection between the hub of the pulley and hub of the fly wheel is established by means of pins 23, the opposite end portions of which are arranged in alining longitudinal openings formed in the opposed ends of the hubs of the fly wheel and pulley. The end portion of the hub of the pulley opposite to the end connected with the hub of the fly wheel is provided with a clutch surface. Slidingly fitted on the shaft 17 between one of the boxings thereof and the clutch surface of the pulley is a clutch collar 24, and positioned between one end of the clutch collar and the adjacent boxing is a thrust spring 25 which yieldingly holds the surface of the clutch collar in engagement with the clutch surface of the pulley. It will be understood of course that the clutch collar 24 is splined on the shaft 17, so that when in engagement with the pulley and the latter rotated by a suitable belt rotary movement will be imparted to the shaft 17. The opposite end portion of the shaft 17, or that end remote from the end of the fly wheel and pulley is provided with a collar 26, the surface of which bears on the adjacent boxing and prevents endwise movement of the shaft in one direction. Endwise movement of the shaft in the opposite direction is prevented by means of a pair of hooks 27 and 28, the inner end portions of which are secured to the boxing and the outer end portions of which bear on the outer surface of the collar 26.

Journaled on the shaft 17 and adjacent to the opposed inner surfaces of the boxings for the said shaft are bevel gears 29 and 30′, the said bevel gears being provided with hubs 30 and 31, the opposite ends of said hubs extending beyond the opposite faces of the said bevel gears 29 and 30′. The outer end portions of the hubs 30 and 31 are provided with circular grooves 32′ and 33, and secured to the upper sides of the boxings for the shaft 17 are the end portions of hooks 34 and 35, the opposite end portions of which are arranged in the grooves 32′ and 33, and serve to prevent endwise movement of the bevel gears 29 and 30′ on the shaft 17. The opposite end portions of the hubs 31 and 32 are provided with clutch surfaces 36, the function of which will appear later Splined on the shaft 17 and between the bevel gears 29 and 30′ are collars 37 and 38, the outer ends of which are provided with clutch surfaces 39 to engage with the clutch surfaces 36 of the bevel gears 29 and 30′. Keyed to the shaft 17 and between the inner ends of the collars 37 and 38 is a worm 40, the function of which will presently appear.

Positioned on the medial portions of the upper surfaces of the longitudinally disposed beams 13 and 14 are boxings 41 and 42 and journaled in the said boxings are the opposite end portions of a shaft 43. Keyed to the intermediate portion of the shaft 43 is a worm gear 44, the teeth of which mesh with the worm 40.

By reference now to Figs. 1, 3 and 4 of the drawings it will be seen that connecting the collars 37 and 38 is a shifting member, in the form of a U-shaped yoke, the opposite limbs of which are designated by the numerals 45 and 46. The limbs 45 and 46 are reduced in width from the medial portions to the free ends thereof, and formed in the widened portions of the limbs, are sockets 47, which receive the outer end portions of the collars 37 and 38. The yoke is prevented from disengagement with the collars by means of straps 48 which extend transverse the upper end portions of the sockets and bear on a portion of the peripheries of the collars 37 and 38. The limbs 45 and 46 extend upwardly to points beyond the upper side of the worm gear 44. Formed on the shaft 43 and adjacent to the worm gear 44 are oppositely disposed flattened portions 49, best shown in Fig. 3. The yoke is additionally supported and held against rotation on the shaft 17 by means of a transversely disposed U-shaped strap iron 13′, the opposite limbs of which are secured to and depend from the beams 13 and 14 and the relatively wide medial portion of which bears on the corresponding portion of the yoke.

The yoke actuating member comprises a U-shaped arm, the opposite limbs of which are designated by the numerals 50 and 51. Slidingly fitted between the arms 50 and 51 and arranged adjacent to the connected ends of said arms is a draw head 52. The draw head 52 is provided with a semi-circular seat, which coöperates with the inner end of the U-shaped member to provide a central opening for the reception of a shaft or axle 53. That portion of the arm overlying the axle is slotted longitudinally as shown at 54, in Fig. 4 of the drawings. Arranged on the shaft 51 and extending through the slotted portion 54 is a roller 55, the function of which will appear later. Positioned on the opposed inner surfaces of the limbs 50 and 51 and extending longitudinally of said limbs are straps 56 and 57, the said straps being secured by means of clamping bolts 58, passing through opposite end portions of the straps and through the limbs 50 and 51. The straps 56 and 57 bear on the flattened portions 49 of the shaft 43, and with this construction it will be manifest when the shaft 43 rotates the arm and roller will likewise be rotated. By the provision of the clamping bolts and straps, it will be manifest that the end portion of the U-shaped member carrying the roller may be adjustably secured at various distances from the axes of the shaft 43.

In the operation of the parts thus far described, it will be manifest when the clutch collar 24 is in engagement with the pulley 22 and the latter rotated, that rotary movement will be imparted to the shaft 17, and also to the collars 37 and 38 and the worm 40. Assuming now that the clutch surface of the collar 38 to the right in Fig. 1 is in engagement with the clutch surface of the bevel gear 30' it will be evident that rotary movement will be imparted to said bevel gear. Remembering that the worm 40 meshes with the worm gear 44 and assuming that the arm is moving in the direction indicated by the arrow in Fig. 1 and is at a position substantially intermediate the limbs 45 and 46 of the yoke, it will be seen that as the arm continues to move in the direction of the arrow the roller 55 will engage with the limb 45 of the yoke and as the arm continues to rotate the yoke will be moved lengthwise of the shaft 17 carrying with it the collars 37 and 38, the collar 38 moving from engagement with the clutch surface of the bevel gear 30', while the clutch surface of the collar 37 moves into engagement with the clutch surface of the bevel gear 29. It will be seen when the arm continues to rotate in the same direction that the spring 59, which bears on one end of the draw head and the adjacent ends of the straps 56 and 57 will be slightly compressed until the roller moves from engagement with the limb 45, whereupon continued movement of the roller will move the arm into engagement with the limb 46, thus moving the clutch surface of the collar 38 to its original position in engagement with the clutch surface of the bevel gear 30'.

The medial portions of the end sills 10 are connected by a substantially inverted U-shaped support 60, and formed in the central portion of the support 60 is a circular opening. The support 60 preferably comprises two sections each of which is provided with a semi-circular recess, these recesses coöperating when the sections are positioned as shown in Fig. 2 of the drawing to provide the circular opening, before stated. A vertically disposed shaft extends through the opening of the support and is provided with a grooved collar 61 the groove of which receives the wall of the circular opening. Keyed to that portion of the shaft above the collar is a horizontally disposed bevel gear 62, the teeth of which mesh with the bevel gears 29 and 30'. The portion of the shaft below the collar 61 is exteriorly screw-threaded as shown at 63. Threaded onto the shaft is an interiorly threaded bushing 64', the said bushing being considerably less in length than the length of the shaft and fixedly secured to the opposite sides of the bushing and extending longitudinally of the base frame are horizontally disposed arms 64 and 65. Depending from the opposite end portions of the arms 64 and 65 are hangers 66 and 67.

What will subsequently be termed a reciprocating mold section is designated by the numeral 68. This member is substantially crescent-shaped in cross section and in length corresponds to the length of the tile to be formed. Fixedly secured to the convex surface of the sections 68 and corresponding in length to the length of the latter is a rubber cushion 69 and fixedly secured to the upper surface of the cushion is a block 70. The means for securing the block to the cushion and mold section 68 comprise bolts 71, which pass through alining openings in the mold section, cushion and block, the lower ends of the said bolts having heads 60 which are arranged in countersinks in the concaved surface of the section 68, the upper ends of said bolts extending beyond the blocks and having threaded thereon nuts 72. The block is secured to the lower end portions of the hangers by means of bolts 73, which pass through transverse openings formed in the hangers and block.

By reference now to Fig. 1 it will be seen that depending from the medial portions of the end sills 10 are what will subsequently be termed guide strips 74, and extending outwardly from the opposite ends of the block 70 are arms 75 and 76 best shown in Fig 7, the inner end portions of the said arms being connected by means of pins 77 and journaled in the outer end portions of the arms are rollers 78, which bear on the guides 74. With this construction it will be manifest that the reciprocating mold section and its parts will be guided during upward and downward movement.

The medial portions of the uprights 7 and 8 are connected by cross bars 79 which extend in a direction transverse the base frame. The medial portions of these bars are connected by the opposite ends of a platform 80, best shown in Fig. 2. Extending transverse the table and fixedly secured thereto are rails 81, as shown in Fig. 1. Three of these rails are employed and are arranged at the intermediate and opposite end portions of the table. Rising upwardly from the medial portion of one of the side bars 5 of the supporting frame is a bracket 81', and fixedly secured to the upper end portion of the bracket is a boxing. Secured to the uprights 7 and 8 opposite to those adjacent to the bracket 81' are boxings 82, in alinement with the boxings of the bracket. Journaled in the boxings of the bracket and upright are shafts 83 and 84, the said shafts extending longitudinally of the frame and slightly below the plane of the table 80. Keyed to the opposite end portions of the shafts 83 and 84 and adjacent to the inner sides of the uprights 7 and 8 are sprocket wheels 85 and 86, and trained over the said sprocket wheels are endless sprocket chains or carriers 87 and 88. Certain of the links of the sprocket chains are of peculiar construction, inasmuch as extensions 89 are formed on the inner sides of certain of said links as best shown in Fig. 6. The extensions 89 of the chains are directly opposite each other and the links provided with said extensions may be spaced apart for any required distance according to the number of mold sections to be employed. Fixedly secured to the extensions 89 are the opposite ends of a plurality of mold sections 90, the said mold sections 90 being substantially semi-circular in contour and coöperating with the section 68, when mold sections are in engagement, to present a circular-shaped opening, as best shown in Fig. 5. By reference now to Fig. 1 it will be seen that the chains 87 and 88 are arranged beyond the outer sides of the end rails 81, the upper sides of said chains being substantially in alinement with the upper sides of the rails so that when the shafts 83 and 84 are rotated and also the chains 87 and 88, that the mold sections 90 will be carried over the rails 81 and table 80, the lower sides of said mold sections engaging with the upper sides of the rails as shown in Fig. 1. The means for imparting rotary movement to the mold sections comprises a handle wheel 91, which is secured to one end of the shaft 84 as shown in Fig. 1. With this construction it will be manifest that any of the mold sections 90 may be moved to a position in alinement with the reciprocating mold section 68 and when so positioned the latter may be caused to descend, whereupon the parts will assume the positions shown in Fig. 5. It will be seen when the reciprocating mold section moves into the mold section 90 that the downward pressure produced by the reciprocating mold section will be centered on the rails and table.

Rising from the end portions of the sides 5 of the base frame and adjacent to the uprights 8 are posts 92, the said posts rising to a position above the table 80. The upper end portions of the posts are connected by a cross piece 93 having a centrally disposed boxing, the axis of said boxing being in alinement with one of the mold sections 90 when the latter is moved to a position directly beneath the mold section 68. Slidingly fitted in the boxing is a core 94, corresponding approximately in length to the length of the base frame and in diameter approximately to the diameter of the circular opening presented by the mold sections when the latter are in engagement. Connecting the medial portions of the posts 92 and directly beneath the cross bar 93 is a similar cross bar (not shown). A similar cross bar connects the adjacent uprights 8 and supported by these cross bars are rollers 95. A rack bar is designated by the numeral 96 and bears on the rollers 95, the said rack bar corresponding in length approximately to the length of the core and terminating at its outer end in an upwardly inclined extension 97, the extremity of which is secured to the outer end portion of the core 94. Extending outwardly from the uprights 8 adjacent to the posts 92 are brackets, in which are journaled the opposite ends of a shaft 99. One end portion of the shaft is provided with a crank handle 100 and keyed to the medial portion of the shaft is a crown gear 101, the teeth of which mesh with the teeth of the rack bar 96. With this construction it will be manifest when one of the mold sections 90 is in alinement with the mold section 68 and the parts in position as shown in Fig. 1 that by turning the crank handle 100 in one direction, the core will pass into the mold section 90, so that when clay is placed in the mold section 90 and the core positioned therein and the reciprocating mold section moved downwardly the clay will be compressed into a cylinder so that when the crank handle is turned in the opposite direction and the mold withdrawn the formation of the tile will be completed. By reference now to Figs. 2 and 11 it will be seen that the mold sections 90 are on the end remote from the outer end of the core provided with plates 102, the said plates having openings 103, to receive the free end of the core when the latter extends through the mold section 90, and serving to hold said core against movement when the clay is being compressed.

In order to yieldingly hold the mold section in alinement with the mold sections 68, after the hand wheel 91 has been turned the following construction is employed:—By reference now to Fig. 1 it will be seen that extending through the medial portions of the rails 81 is a shaft 104, and extending radially from the said shaft and fixedly secured thereto are hooks 105. One end portion of the shaft is provided with an operating handle 106, and connecting the operating handle to the cross piece 79 is a helical retractile spring 107. The position of the hooks is such that when the spring 107 is retracted, and the operating handles extend vertically upward the free end portions of the hooks will extend above the plane of the upper sides of the rails 81, and into the path of movement of the mold sections 90. With this construction it will be manifest that when one of the mold sections moves into alinement with the mold sections 68 it will be engaged by the hooks 105, whereby further movement in one direction will be prevented until the operating handle 106 is moved, whereupon the hooks will descend, thus permitting the hand wheel 91 to be turned to bring the next mold section 90 into alinement with the mold section 68.

Arranged adjacent to the upper ends of the uprights 8 and extending transverse the base frame is a shaft 108, and arranged on the medial portion of the said shaft is a three-armed lever 109, the function of which will presently appear. By reference now to Fig. 3 of the drawings it will be seen that the clutch collar 24 is provided with a circular groove, and arranged in this groove is the bifurcated upper end of an arm 110. Rising from one of the end sills 10 is an upright 111, the upper end portion of which is provided with a lateral pin 112, upon which is loosely fitted the medial portion of the arm 110. The lower end portion of the arm 110 curves outwardly and downwardly from the outer side of the end sill 10, as shown in Figs. 1 and 3. One arm of the lever 109 normally bears on the downwardly curved portion of the arm 110 while another arm of said lever extends to a point adjacent the hangers 66. Extending downwardly and outwardly from one of the hangers 66 is a spring arm 113, the free end portion of which is provided with a roller to engage with the adjacent side of the lever 109. Extending outwardly from the uprights 8 and at a point above the core 94 are brackets 114, in which are journaled the opposite ends of a shaft 115. One end of the shaft 115 is provided with a crank handle 116, and fixedly secured to the medial portion of the shaft is a cam roller 117, to engage with the other arm of the lever 109.

In the operation of the device and assuming that the core is within one of the mold sections 90 and a quantity of soft clay or similar plastic material is placed therearound, it will be manifest when motion is imparted to the gear wheel 62, by means of the bevel gear 30', in the manner before described, it being assumed that the parts are in position as shown in Fig. 1 that rotary movement will be imparted to the screw threaded shaft, whereupon the reciprocating mold section will descend and compress the clay within the mold. When the movable mold section has reached the limit of its downward movement the roller 55 will engage with the limb 46 of the yoke, thus shifting the position of the collars 37 and 38 so that the threaded shaft and gear wheel 62 will rotate in the opposite direction, thus raising the movable section. As the movable section moves upwardly and the roller at the end of the spring arm 113 engages with the extremity of the adjacent arm of the lever 109, the upwardly inclined arm of said lever in engagement with the arm 110 will be rocked outwardly, thus imparting a similar movement to that end portion of the arm 110 in engagement with the clutch collar 24, so that the said clutch collar will be moved from engagement with the pulley 22, whereby rotary movement of the bevel gears and shaft will cease. When disengagement between the clutch collar and pulley is effected, and the shaft 17 ceases to rotate, the clutch collar will remain out of engagement with the pulley until the spring arm 113 is pressed inward, whereupon the free arm lever will be released and the clutch collar moved to normal position by the action of the spring 25. When it is desired to effect disengagement between the clutch collar and pulley in order to cause the reciprocating mold section to stop at any point from the mold section 90, the crank handle 116 is turned in one direction whereupon the cam roller 117 will rock the free arm lever thus effecting disengagement between the clutch collar and pulley.

From the foregoing, it is evident that I have provided a device which is comparatively simple in structure and inexpensive in manufacture, embodying few parts and these so arranged that the danger of derangement will be reduced to a minimum.

I claim:—

1. In a tile making machine, the combination with a power shaft, a sectional mold having one section thereof vertically movable, a plurality of gear wheels loosely mounted on said shaft and connected with the movable mold section; of a plurality of clutch members splined on the main shaft, and a rotatable means actuated by the main shaft and a spring-pressed roller carried by said rotatable means to alternately move said clutch members into and out of engagement with said gears.

2. In a tile making machine, the combination with a power shaft, a sectional mold having one section thereof vertically movable, a plurality of gear wheels loosely mounted on said shaft and connected with the movable mold section; of a plurality of clutch members splined on the main shaft, and a rotatable arm actuated by the main shaft having a yieldingly held member to alternately engage with said clutch members to move the latter into and out of engagement with said bevel gears.

3. In a tile making machine, the combination with a main shaft, of a plurality of bevel gear wheels loosely fitted on said shaft and provided with clutch surfaces, a plurality of clutch collars splined on said shaft, and a U-shaped connection between said clutch collars; of a rotatable arm actuated by said main shaft having a portion to alternately engage with the limbs of the U-shaped connection between said collars and serving to move the latter into and out of engagement with said bevel gear wheels.

4. In a tile making machine, the combination with a main shaft, of a plurality of bevel gear wheels loosely fitted on said shaft and provided with clutch surfaces, a plurality of clutch collars splined on said shaft, and a connection between said clutch collars; of a rotatable arm actuated by said shaft and having a yieldingly held roller to alternately engage with opposite portions of the connection between said clutch collar and serving to move the latter into and out of engagement with said bevel gear wheels.

In testimony whereof I affix my signature in presence of two witnesses.

JACOB L. JOHNSON.

Witnesses:
F. T. ROLOSON,
C. G. WITHERSPOON.

Copies of this patent may be obtained for five cents each, by addressing the "Commissioner of Patents, Washington, D. C."